(12) United States Patent
Sha et al.

(10) Patent No.: US 11,102,327 B1
(45) Date of Patent: Aug. 24, 2021

(54) METHOD, DEVICE, AND COMPUTER PROGRAM PRODUCT FOR ACQUIRING VISUAL CONTENT

(71) Applicant: EMC IP Holding Company LLC, Hopkinton, MA (US)

(72) Inventors: Danqing Sha, Shanghai (CN); Zhen Jia, Shanghai (CN); Bin He, Shanghai (CN); Xuwei Tang, Nanjing (CN)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 17/080,307

(22) Filed: Oct. 26, 2020

(30) Foreign Application Priority Data

Sep. 30, 2020 (CN) .......................... 202011056322.X

(51) Int. Cl.
*G06T 19/00* (2011.01)
*G06K 9/00* (2006.01)
*H04L 29/08* (2006.01)
*H04L 29/06* (2006.01)

(52) U.S. Cl.
CPC .......... *H04L 67/32* (2013.01); *G06K 9/00671* (2013.01); *G06T 19/006* (2013.01); *H04L 67/38* (2013.01)

(58) Field of Classification Search
CPC ..... H04L 67/32; H04L 67/38; G06K 9/00671; G06T 19/006
See application file for complete search history.

(56) References Cited

U.S. PATENT DOCUMENTS

| | | | |
|---|---|---|---|
| 8,918,087 B1* | 12/2014 | Paczkowski | H04L 65/4084 455/414.2 |
| 2008/0243794 A1* | 10/2008 | Tanaka | G06F 16/337 |
| 2011/0060798 A1* | 3/2011 | Cho | H04L 67/1031 709/206 |

(Continued)

OTHER PUBLICATIONS

M. Chen et al., "Spatiotemporal GMM for Background Subtraction with Superpixel Hierarchy," IEEE Transactions on Pattern Analysis and Machine Intelligence, vol. 40, No. 6, Jun. 2018, 8 pages.

(Continued)

*Primary Examiner* — Jitesh Patel
(74) *Attorney, Agent, or Firm* — Ryan, Mason & Lewis, LLP

(57) ABSTRACT

Embodiments of the present disclosure relate to a method, a device, and a computer program product for acquiring visual content. A method for acquiring visual content is provided, which includes: if a request for viewing visual content is received from a terminal device, determining, at a content providing device, target visual content corresponding to the request; based on storage information related to at least one copy of the target visual content, determining a to-be-provided copy from the at least one copy, a distance between a storage location of the to-be-provided copy and a location of the terminal device being smaller than a threshold distance; and transmitting the to-be-provided copy to the terminal device. Through embodiments of the present disclosure, it is possible to reduce the delay in acquiring visual content, increase the flexibility in acquiring visual content, and reduce the processing load of the terminal device.

20 Claims, 5 Drawing Sheets

(56) References Cited

U.S. PATENT DOCUMENTS

2012/0256954 A1* 10/2012 Soon-Shiong ...... G06F 16/9537
345/633

OTHER PUBLICATIONS

J. Huang et al., "An Efficient Optical Flow Based Motion Detection Method for Non-stationary Scenes," 2019 IEEE Chinese Control and Decision Conference (CCDC), Jun. 3-5, 2019, pp. 5272-5277.
J. Redmon et al., "You Only Look Once: Unified, Real-Time Object Detection," 2016 IEEE Conference on Vision and Pattern Recognitions (CVPR), Jun. 27-30, 2016, 10 pages.
Microsoft, "Introduction to Mixed Reality Development," https://docs.microsoft.com/en-us/windows/mixed-reality/develop/development?tabs=unity, Accessed Oct. 26, 2020, 4 pages.
Google, "ARCore Overview," https://developers.google.com/ar/discover, Feb. 28, 2019, 3 pages.
U.S. Appl. No. 17/079,632, filed in the name of Zhen Jia et al. filed Oct. 26, 2020, and entitled "Method, Device, and Computer Program Product for Managing Virtual Visual Content."

* cited by examiner

METHOD, DEVICE, AND COMPUTER PROGRAM PRODUCT FOR ACQUIRING VISUAL CONTENT

RELATED APPLICATION(S)

The present application claims priority to Chinese Patent Application No. 202011056322.X, filed Sep. 30, 2020, and entitled "Method, Device, and Computer Program Product for Acquiring Visual Content," which is incorporated by reference herein in its entirety.

FIELD

Embodiments of the present disclosure generally relate to the field of information processing, and specifically to a method, a device, and a computer program product for acquiring visual content.

BACKGROUND

The presentation of visual content can bring people a rich and vivid experience. At present, most of the processing in a visual content presentation technology is usually implemented at a terminal device for viewing visual content. However, the visual content presentation technology is computationally intensive, which requires powerful processing power and sufficient storage space. Insufficient processing capabilities of the terminal device will increase the delay in interaction between a user and visual content.

In addition, current visual content presentations are usually task-specific. That is, in order to watch specific visual content, the user must install a specific application capable of presenting the visual content on the terminal device, and then send a request for viewing visual content through the specific application. The task-specific visual content presentation scheme reduces the flexibility for users to view visual content.

SUMMARY

Illustrative embodiments of the present disclosure provide a method, a device, and a computer program product for acquiring visual content.

In a first aspect of the present disclosure, a method for acquiring visual content is provided. The method includes: if a request for viewing visual content is received from a terminal device, determining, at a content providing device, target visual content corresponding to the request; based on storage information related to at least one copy of the target visual content, determining a to-be-provided copy from the at least one copy, a distance between a storage location of the to-be-provided copy and a location of the terminal device being smaller than a threshold distance; and transmitting the to-be-provided copy to the terminal device.

In a second aspect of the present disclosure, a method for acquiring visual content is provided. The method includes: if a request for viewing visual content is received, determining, at a terminal device, a content providing device for providing a copy of target visual content corresponding to the request, a distance between the content providing device and the terminal device being smaller than a threshold distance; sending the request to the content providing device; and receiving the target visual content from the content providing device, the target visual content being determined by the content providing device.

In a third aspect of the present disclosure, an electronic device is provided. The device includes: at least one processing unit; at least one memory coupled to the at least one processing unit and storing instructions for execution by the at least one processing unit, wherein the instructions, when executed by the at least one processing unit, cause the device to perform actions including: if a request for viewing visual content is received from a terminal device, determining, at a content providing device, target visual content corresponding to the request; based on storage information related to at least one copy of the target visual content, determining a to-be-provided copy from the at least one copy, a distance between a storage location of the to-be-provided copy and a location of the terminal device being smaller than a threshold distance; and transmitting the to-be-provided copy to the terminal device.

In a fourth aspect of the present disclosure, an electronic device is provided. The device includes: at least one processing unit; at least one memory coupled to the at least one processing unit and storing instructions for execution by the at least one processing unit, wherein the instructions, when executed by the at least one processing unit, cause the device to perform actions including: if a request for viewing visual content is received, determining, at a terminal device, a content providing device for providing a copy of target visual content corresponding to the request, a distance between the content providing device and the terminal device being smaller than a threshold distance; sending the request to the content providing device; and receiving the target visual content from the content providing device, the target visual content being determined by the content providing device.

In a fifth aspect of the present disclosure, a computer program product is provided. The computer program product is tangibly stored in a non-transitory computer storage medium and includes machine-executable instructions. The machine-executable instructions, when executed by a device, cause this device to implement any step of the method described according to the first aspect of the present disclosure.

In a sixth aspect of the present disclosure, a computer program product is provided. The computer program product is tangibly stored in a non-transitory computer storage medium and includes machine-executable instructions. The machine-executable instructions, when executed by a device, cause this device to implement any step of the method described according to the second aspect of the present disclosure.

This Summary is provided in order to introduce the selection of concepts in a simplified form, which will be further described in the detailed description below. The Summary is neither intended to recognize important features or essential features of the present disclosure, nor intended to limit the scope of the present disclosure.

BRIEF DESCRIPTION OF THE DRAWINGS

The above and other objectives, features, and advantages of the present disclosure will become more apparent from the following detailed description of example embodiments in combination with the accompanying drawings. In the example embodiments of the present disclosure, the same reference numerals generally represent the same parts.

In the accompanying drawings, the same or corresponding numerals represent the same or corresponding parts.

DETAILED DESCRIPTION

Figure 1:
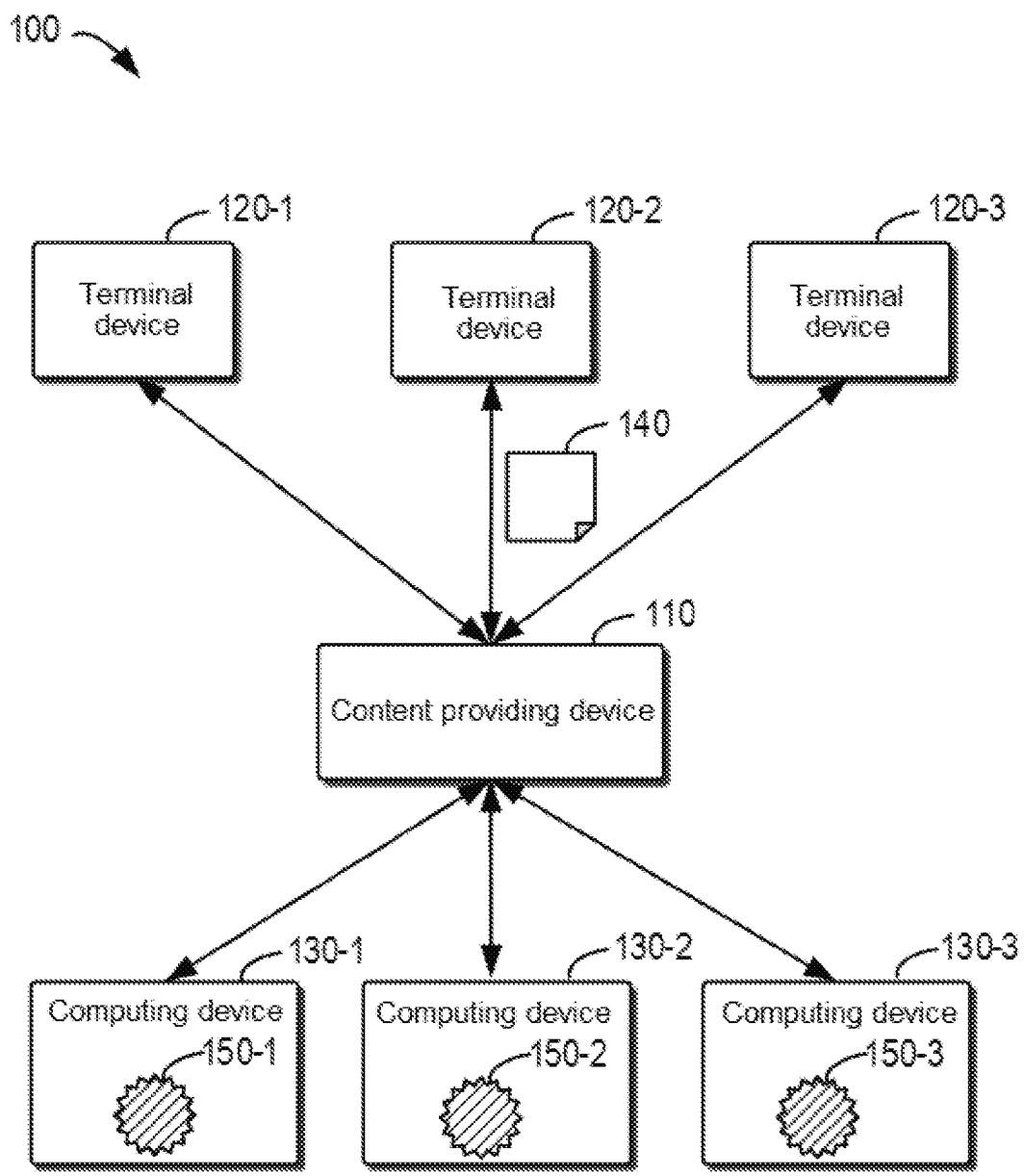
FIG. 1 shows a block diagram of an example visual content acquisition system in which embodiments of the present disclosure can be implemented.

Illustrative embodiments of the present disclosure will be described in more detail below with reference to the accompanying drawings. Although the illustrative embodiments of the present disclosure are shown in the accompanying drawings, it should be understood that the present disclosure can be implemented in various forms and should not be limited by the embodiments set forth herein. Rather, these embodiments are provided to make the present disclosure more thorough and complete and to fully convey the scope of the present disclosure to those skilled in the art.

The term "include" and its variants as used herein indicate open-ended inclusion, that is, "including, but not limited to." Unless specifically stated, the term "or" indicates "and/or." The term "based on" indicates "based at least in part on." The terms "an exemplary embodiment" and "an embodiment" indicate "at least one exemplary embodiment." The term "another embodiment" indicates "at least one additional embodiment." The terms "first," "second," and the like may refer to different or identical objects. Other explicit and implicit definitions may also be included below.

As mentioned above, the presentation of visual content can bring people a rich and vivid experience. For example, Augmented Reality (AR) or Mixed Reality (MR) can integrate virtual information with the real world so that people can get an enhanced experience of the real world.

Conventionally, most of the processing in a visual content presentation technology is implemented at a terminal device for viewing visual content. However, the visual content presentation technology is computationally intensive, which requires powerful processing power and sufficient storage space. Insufficient processing capabilities of the terminal device will increase the delay in interaction between a user and the visual content. Since humans are very sensitive to the delay of visual content, excessive delay will cause disorientation and nausea to users watching the visual content. Therefore, the visual content presentation technology must meet high delay requirements. Generally speaking, the acceptable delay is within 5 milliseconds. Once the delay requirement is not met, the user will feel discomfort, which greatly reduces user satisfaction. In addition, because the terminal device needs to perform computationally intensive processing, the terminal device will become expensive and oversized, and the terminal device will overheat and have a shortened service life due to being overloaded.

In addition, current visual content presentations are usually task-specific. That is, in order to watch specific visual content, the user must install a specific application capable of presenting the visual content on the terminal device, and then send a request for viewing visual content through the specific application. Otherwise, the user must use a dedicated terminal device for viewing visual content, for example, an AR headset, AR glasses, and so on. The task-specific visual content presentation scheme reduces the flexibility for users to view visual content.

Illustrative embodiments of the present disclosure provide a solution for acquiring visual content to solve one or more of the above-mentioned problems and other potential problems. In the solution, after a request for viewing visual content is received from a terminal device, target visual content corresponding to the request is determined at a content providing device; according to storage information related to at least one copy of the target visual content, a to-be-provided copy is determined from at least one copy, a distance between a storage location of the to-be-provided copy and a location of the terminal device being smaller than a threshold distance; and the to-be-provided copy is transmitted to the terminal device. Through such a solution, not only can the delay in acquiring visual content be reduced, but also the visual content presentation and flexibility can be improved. These are all conducive to improving the user experience.

FIG. 1 shows a block diagram of example visual content acquisition system 100 in which embodiments of the present disclosure can be implemented. As shown in FIG. 1, visual content acquisition system 100 includes content providing device 110 and terminal devices 120-1 to 120-3 (collectively referred to as terminal device 120).

As shown in FIG. 1, content providing device 110 may determine target visual content corresponding to request 140 after receiving request 140 for viewing visual content from terminal device 120. Content providing device 110 may determine a to-be-provided copy from at least one copy 150 according to storage information related to at least one copy 150-1 to 150-3 (collectively referred to as copy 150) of the target visual content. After determining the to-be-provided copy, content providing device 110 may transmit the to-be-provided copy to terminal device 120. In some embodiments, copy 150 may be stored at computing devices 130-1 to 130-3 (collectively referred to as computing device 130) separate from content providing device 110. Alternatively or additionally, in some embodiments, copy 150 may also be stored at content providing device 110.

Content providing device 110 may be, for example, a computer, a virtual machine, a server, a cloud computing device, and so on. Terminal device 120 may be an AR/MR content viewing device. The AR/MR content viewing device may be a smart phone, a smart tablet, a smart wearable device, a standalone AR headset, standalone AR glasses, and so on. Computing device 130 may be a computer, a server, a cloud computing device, and so on. The cloud computing device may be a cloud computing device provided by different cloud providers. Content providing device 110, terminal device 120, and computing device 130 may be connected to each other through a network. The network can be the Internet, Intranet, WiFi, 5G, and so on. The present disclosure is not limited in this regard.

It should be understood that the structure of visual content acquisition system 100 is described for illustrative purposes only, and does not imply any limitation to the scope of the present disclosure. For example, embodiments of the present disclosure may also be applied to a system different from visual content acquisition system 100. It should be understood that the specific numbers of the above devices, requests, and copies of the visual content are given for illustrative purposes only, and do not imply any limitation to the scope of the present disclosure.

Figure 2:
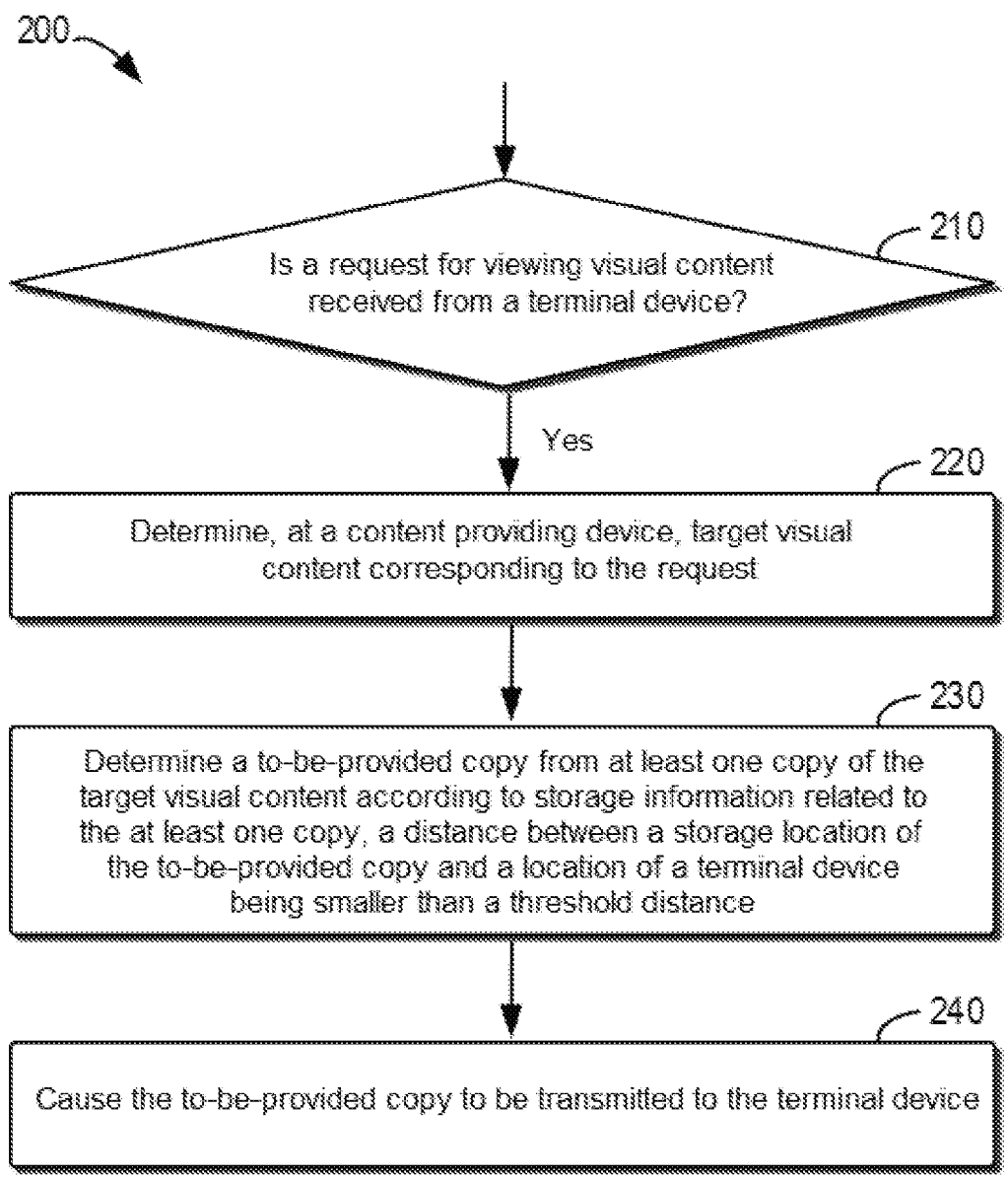
FIG. 2 shows a flowchart of an example method for acquiring visual content according to an embodiment of the present disclosure.

FIG. 2 shows a flowchart of example method 200 for acquiring visual content according to an embodiment of the present disclosure. For example, method 200 may be performed by content providing device 110 as shown in FIG. 1. It should be understood that method 200 may also be performed by other devices, and the scope of the present disclosure is not limited in this regard. It should also be understood that method 200 may also include additional actions not shown and/or omit actions shown, and the scope of the present disclosure is not limited in this regard.

At 210, content providing device 110 determines whether request 140 for viewing visual content is received from terminal device 120.

In some embodiments, terminal device 120 may send request 140 to content providing device 110 after receiving request 140 for viewing visual content initiated by a user of terminal device 120, so that content providing device 110 receives request 140. Additionally, in some embodiments, the user of terminal device 120 may send request 140 to terminal device 120 through an application for viewing visual content, and terminal device 120 sends request 140 to content providing device 110.

Alternatively or additionally, in some embodiments, the user may use terminal device 120 to scan a mark such as a QR code, and then terminal device 120 sends the scanned mark as request 140 to content providing device 110. Alternatively or additionally, in some embodiments, the user may use terminal device 120 to photograph or scan an object in the surrounding environment, and then send an image of the photographed or scanned object as request 140 to content providing device 110.

For example, if a user is viewing an artwork in a museum, in some examples, the user may click a button in an application for viewing visual content to send request 140 for viewing visual content to terminal device 120. Alternatively or additionally, in some examples, the user can use terminal device 120 to scan a QR code near a certain artwork to initiate request 140 for viewing visual content to terminal device 120, and then terminal device 120 sends the scanned mark as request 140 to content providing device 110. Alternatively or additionally, in some examples, the user may also use terminal device 120 to photograph or scan a certain artwork to initiate request 140 for viewing visual content to terminal device 120, and then terminal device 120 sends an image of the photographed or scanned object as request 140 to content providing device 110.

After determining that request 140 for viewing visual content is received from terminal device 120, at 220, content providing device 110 determines target visual content corresponding to request 140.

The visual content can be various types of content. For example, the visual content may be a guide image such as a map, a route map, and so on. The visual content may be an image or text content associated with a specific place in the real world. For example, the visual content may be text introducing artworks in a museum, cartoon images of animals in a zoo, and so on.

The target visual content may be visual content associated with objects in the environment surrounding terminal device 120. For example, in the scenario of visiting a museum described above, the target visual content may be a detailed introduction about a certain artwork. In other scenarios, the target visual content may be a route map, a schedule of public transportation, and so on.

The process of determining the target visual content is computationally intensive, which involves computationally intensive processing such as tracking, mapping, classification, feature processing, and object recognition. In some embodiments, content providing device 110 may acquire state information of terminal device 120, and the state information includes an image of the environment surrounding terminal device 120. Content providing device 110 may determine the target visual content according to the state information. More details on determining target visual content will be described in detail with reference to FIG. 3 below.

In embodiments of the present disclosure, it is beneficial that the target visual content is determined by content providing device 110 instead of terminal device 120. The computationally intensive processing is offloaded from terminal device 120 to content providing device 110, so that terminal device 120 can only be responsible for lightweight processing such as transmitting requests and presenting target visual content. In this way, terminal device 120 can be made to be more portable and have a lower cost and a longer service life. By using content providing device 110 with stronger computing power to handle the computationally intensive process, the processing delay can be reduced.

At 230, content providing device 110 determines the to-be-provided copy from at least one copy 150 according to the storage information related to at least one copy 150 of the target visual content, a distance between the storage location of the to-be-provided copy and a location of terminal device 120 being smaller than a threshold distance.

In an embodiment of the present disclosure, the target visual content may have at least one copy 150, and at least one copy 150 may be stored at different computing devices 130. Alternatively or additionally, in some embodiments, some of at least one copy 150 may be stored at content providing device 110. For example, there may be a content library storing various types of visual content in computing device 130. The visual content can be updated based on real-world information.

After determining the target visual content, content providing device 110 may determine at least one distance between the storage location of the at least one copy and the location of terminal device 120 according to the storage information related to the at least one copy. Content providing device 110 may determine a first distance smaller than a threshold distance from the at least one distance, and determine a copy corresponding to the first distance in at least one copy 150 as a to-be-provided copy.

For example, content providing device 110 may determine, from at least one computing device 130, a computing device whose distance from terminal device 120 is less than a threshold distance based on the location information of computing device 130 storing at least one copy 150, and then determine the copy stored in the computing device to be the to-be-provided copy. The threshold distance may be predetermined. In some embodiments, the threshold distance may be determined according to the delay requirement of rendering the target visual content.

If there are multiple computing devices whose distance is smaller than the threshold distance, in some embodiments, content providing device 110 may randomly determine one computing device from the multiple computing devices whose distance is smaller than the threshold distance, and take the copy stored in the randomly determined computing device as the to-be-provided copy. Alternatively, in some embodiments, content providing device 110 may further determine the computing device with the smallest distance from a plurality of computing devices whose distance is smaller than the threshold distance, and use the copy stored in the computing device with the smallest distance as the to-be-provided copy.

At 240, content providing device 110 causes the to-be-provided copy to be transmitted to terminal device 120. In some embodiments, content providing device 110 may acquire the to-be-provided copy from computing device 130 storing the to-be-provided copy, further process the to-be-provided copy, and then transmit the to-be-provided copy to terminal device 120. Alternatively or additionally, in some embodiments, content providing device 110 may directly transmit the to-be-provided copy from computing device 130 to terminal device 120.

This arrangement is beneficial. For example, storing various types of visual content on computing devices with stronger processing capabilities and larger storage space makes the visual content that can be acquired more abundant and increases the scalability of acquiring visual content. In addition, storing the visual content in different computing devices allows the content providing device to transmit a copy in a nearby computing device to the terminal device after determining the target visual content, reducing the delay in acquiring visual content.

In the above exemplary embodiment, by determining from at least one copy of the target visual content the to-be-provided copy whose distance from the terminal device is smaller than the threshold distance, and causing the to-be-provided copy to be transmitted to the terminal device, the delay of acquiring the target visual content can be reduced.

In addition, since the computationally intensive process of determining the target visual content is executed at the content providing device instead of the terminal device, it can also improve the flexibility of visual content presentation, and make the terminal device to be more portable and have a lower cost and a longer service life. These are all conducive to improving the user experience.

Figure 3:
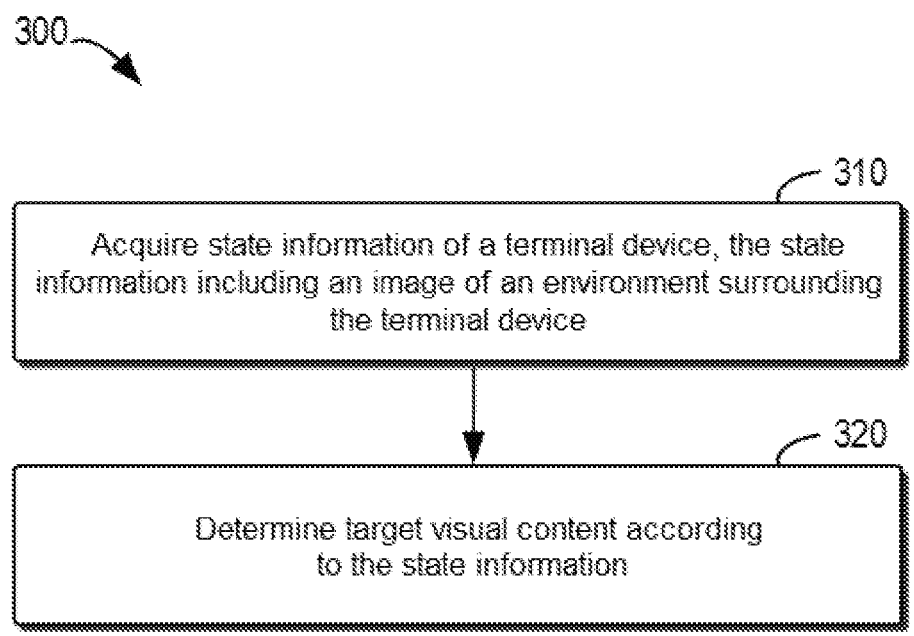
FIG. 3 shows a flowchart of an example method for determining target visual content according to an embodiment of the present disclosure.

FIG. 3 shows a flowchart of example method 300 for acquiring visual content according to an embodiment of the present disclosure. For example, method 300 may be performed by content providing device 110 as shown in FIG. 1. Method 300 is an embodiment of 220 in method 200. It should be understood that method 300 may also be executed by other devices. The scope of the present disclosure is not limited in this regard. It should be further understood that method 300 may further include additional actions that are not shown and/or may omit actions that are shown. The scope of the present disclosure is not limited in this regard.

At 310, content providing device 110 acquires state information of terminal device 120, the state information including an image of an environment surrounding terminal device 120. State information can be acquired in various ways.

In some embodiments, content providing device 110 may acquire state information from a sensor provided on terminal device 120. For example, in some examples, content providing device 110 may acquire an image of the environment surrounding terminal device 120 from a camera provided on terminal device 120.

Additionally or alternatively, in some embodiments, content providing device 110 may acquire state information from sensors provided in the environment surrounding terminal device 120. For example, in some examples, content providing device 110 may acquire an image of the environment surrounding terminal device 120 from a camera provided in the environment surrounding terminal device 120.

Alternatively or additionally, in some examples, content providing device 110 may acquire the location of terminal device 120 from a GPS device provided on terminal device 120, and determine the camera in the environment surrounding terminal device 120 according to the location of terminal device 120, and then acquire an image of the environment surrounding terminal device 120 from the camera.

Additionally or alternatively, in some embodiments, content providing device 110 may acquire state information from a sensor worn by the user of terminal device 120. For example, in some embodiments, content providing device 110 may acquire state information from a smart watch, smart glasses, a headset, and so on worn by a user of terminal device 120.

At 320, content providing device 110 determines target visual content according to the state information. In some embodiments, content providing device 110 may recognize a target object from the image of the environment surrounding terminal device 120, and determine visual content associated with the target object as the target visual content.

For example, in some embodiments, content providing device 110 may recognize all foreground objects as target objects from the image of the environment. Additionally or alternatively, in some embodiments, content providing device 110 may only recognize a certain type of foreground object as the target object from the image of the environment. For example, in the scenario of a museum, content providing device 110 may only recognize the artwork in the image. In the scenario of public transportation, content providing device 110 may only recognize a vehicle in the image. Additionally or alternatively, in some embodiments, content providing device 110 may recognize an object near terminal device 120 as a target object.

The target visual content may be visual content associated with the target object. The target visual content can be various types of visual content. For example, if the target object is an artwork, the target visual content may be a detailed introduction to the artwork. If the target object is a public transportation vehicle, the target visual content may be the timetable, route map, and so on of the public transportation vehicle. If the target object is a machine, the target visual content can be state data, historical maintenance information, and so on of the machine. Additionally, in some embodiments, the target visual content may also be associated with both the target object and the user. For example, when there are multiple routes of buses in a bus stop, the target visual content may be the timetable of the buses that the user often takes.

In the above exemplary embodiment, the target visual content is determined by the state information of the terminal device, so that the target visual content can be determined by the content providing device in real time, without requiring the user to install different applications on the terminal device in order to watch different visual content. This enables visual content to be acquired according to user needs, increasing the flexibility of visual content presentation.

Figure 4:
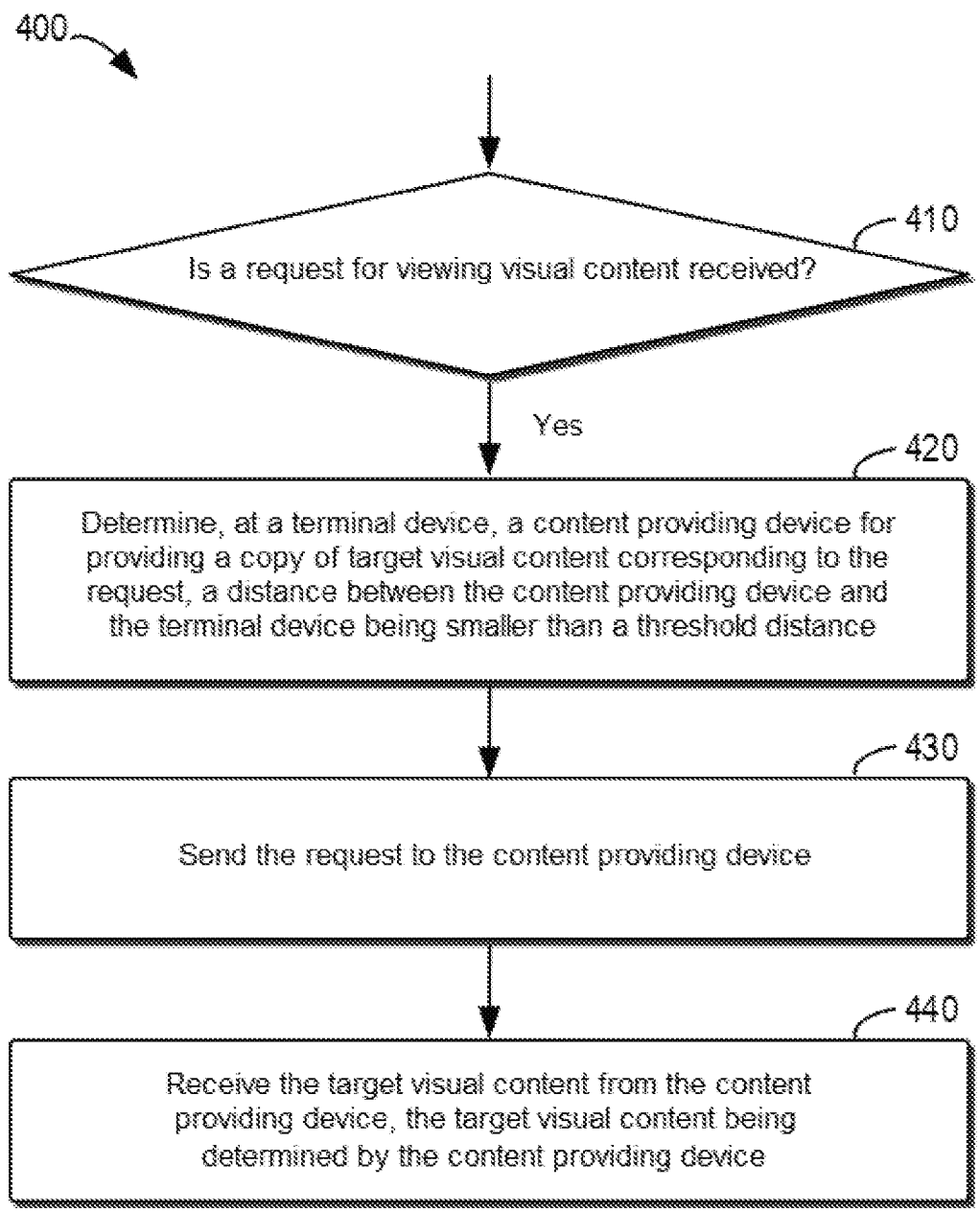
FIG. 4 shows a flowchart of an example method for acquiring visual content according to an embodiment of the present disclosure.

FIG. 4 shows a flowchart of example method 400 for acquiring visual content according to an embodiment of the present disclosure. For example, method 400 may be performed by terminal device 120 as shown in FIG. 1. It should be understood that method 400 may also be performed by other devices, and the scope of the present disclosure is not limited in this regard. It should also be understood that method 400 may also include additional actions not shown and/or omit the actions shown, and the scope of the present disclosure is not limited in this regard.

At 410, terminal device 120 determines whether request 140 for viewing visual content is received. As already described above regarding 210, the user may initiate request 140 to terminal device 120 for viewing visual content. In some embodiments, the user of terminal device 120 may send request 140 to terminal device 120 through an application for viewing visual content. Alternatively or additionally, in some embodiments, the user may use terminal device 120 to scan a mark such as a QR code as request 140. Alternatively or additionally, in some embodiments, the user may use terminal device 120 to photograph or scan an object in the surrounding environment, and then take the image of the photographed or scanned object as request 140. Terminal device 120 may be an AR/MR content viewing device. The AR/MR content viewing device may be a smart phone, a smart tablet, a smart wearable device, a standalone AR headset, standalone AR glasses, and so on.

At 420, terminal device 120 determines a content providing device 110 for providing a copy of the target visual content corresponding to request 140, a distance between content providing device 110 and terminal device 120 being smaller than a threshold distance.

In some embodiments, terminal device 120 may determine at least one distance between at least one candidate device and terminal device 120, and determine a first distance smaller than a threshold distance from the at least one distance. Terminal device 120 may determine the candidate device corresponding to the first distance among the at least one candidate device as content providing device 110. The threshold distance may be predetermined. In some embodiments, the threshold distance may be determined according to the delay requirement of rendering the target visual content.

If there are multiple candidate devices corresponding to respective distances smaller than the threshold distance, in some embodiments, terminal device 120 may randomly determine one device as content providing device 110 from the multiple candidate devices whose distance is smaller than the threshold distance. Alternatively, in some embodiments, terminal device 120 may further determine the candidate device with the smallest distance from among a plurality of candidate devices whose distance is smaller than the threshold distance as the content providing device.

At 430, terminal device 120 sends request 140 to content providing device 110. At 440, terminal device 120 receives target visual content from content providing device 110, the target visual content being determined by content providing device 110. The manner in which the target visual content is determined has been described in detail above with reference to FIGS. 2 and 3, and will not be repeated here.

In some embodiments, terminal device 120 may also acquire an image of the environment surrounding terminal device 120, and send state information of terminal device 120 to content providing device 110 for determining the target visual content. The state information includes an image of the environment surrounding terminal device 120. For example, terminal device 120 may acquire an image of the surrounding environment through a sensor provided on terminal device 120.

This method is beneficial. When the user of the terminal device moves in the real world, the terminal device can send a request to the content providing device near the terminal device to receive the target visual content after the user initiates a request to watch the visual content, instead of sending a request to a fixed content providing device. This reduces the delay in acquiring the target visual content.

In the above exemplary embodiment, by determining at the terminal device a content providing device whose distance from the terminal device is smaller than a threshold distance to receive the target visual content from the content providing device, it is possible to reduce the delay in acquiring the target visual content.

A specific example according to an embodiment of the present disclosure is described below. When a user arrives at a bus stop, he/she initiates a request for viewing visual content through his/her smart phone. The user's smart phone determines an edge server closest to the smart phone from among multiple edge servers nearby, and then sends the request to the nearest edge server as determined.

After receiving the request, the edge server determines the location of the smart phone through the GPS system on the user's smart phone, then determines the camera near the bus stop where the smart phone is located based on the location of the smart phone, and acquires from the camera an image of the bus stop. The edge server performs object recognition on the image of the bus stop, and determines that the target object is the 531 bus of the city, and the target visual content is the 531 bus schedule. The edge server determines the nearest cloud computing device from multiple nearby cloud computing devices, and obtains the timetable of the 531 bus from the nearest cloud computing device, and then transmits the timetable to the user's smart phone to present the timetable to the user.

Another specific example according to an embodiment of the present disclosure is described below. When a user enters a data center that includes multiple hardware devices, he/she initiates a request for viewing visual content through his/her AR glasses. The AR glasses determine the edge server closest to the AR glasses from a plurality of edge servers in the vicinity, and then send the request to the determined nearest edge server.

When a user stays near a certain hardware device to check its operating status, the edge server can obtain an image of the room where the user is located from the camera in the data center. The edge server identifies a target object as the hardware device from the image. The edge server determines the closest cloud computing device from multiple nearby cloud computing devices, acquires the operating data and historical maintenance information of the hardware device from the nearest cloud computing device, and then transmits the operating data and historical maintenance information to AR glasses for presentation. When the user walks to another hardware device, the state data and historical maintenance information corresponding to the hardware device can be transmitted to the AR glasses for presentation. In this way, the efficiency of equipment inspection or maintenance can be improved.

Figure 5:
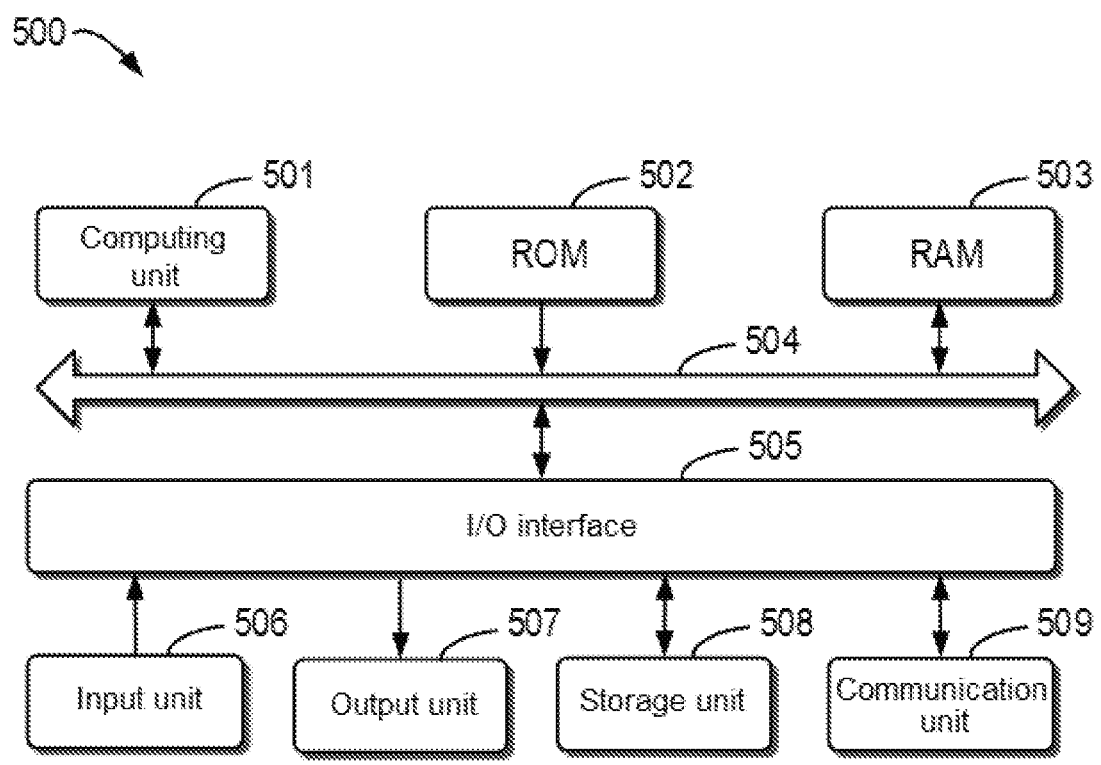
FIG. 5 is a schematic block diagram of an example device that can be used to implement embodiments of the present disclosure.

FIG. 5 is a schematic block diagram of example device 500 that can be used to implement illustrative embodiments of the present disclosure. For example, content providing device 110 and terminal device 120 as shown in FIG. 1 can be implemented by device 500. As shown in FIG. 5, device 500 includes computing unit 501, illustratively a central processing unit (CPU), that may execute various appropriate actions and processing in accordance with computer program instructions stored in read-only memory (ROM) 502 or computer program instructions loaded onto random access memory (RAM) 503 from storage unit 508. In RAM 503, various programs and data required for the operation of device 500 may also be stored. Computing unit 501, ROM 502, and RAM 503 are connected to each other through bus 504. I/O interface 505 is also connected to bus 504.

A plurality of members in device 500 are connected to I/O interface 505, including: input unit 506, such as a keyboard and a mouse; output unit 507, such as various types of displays and speakers; storage unit 508, such as a magnetic disk and an optical disk; and communication unit 509, such as a network card, a modem, and a wireless communication transceiver. Communication unit 509 allows device 500 to exchange information/data with other devices via a computer network such as the Internet and/or various telecommunication networks.

The various processes and processing described above, such as methods 200, 300, and 400, may be performed by computing unit 501. For example, in some embodiments, methods 200, 300, and 400 may be implemented as a computer software program that is tangibly included in a machine-readable medium such as storage unit 508. In some embodiments, some or all of the computer program may be loaded and/or installed onto device 500 via ROM 502 and/or communication unit 509. When the computer programs are loaded to RAM 503 and executed by computing unit 501, one or more actions in methods 200, 300, and 400 described above can be executed.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions for use by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk drive, RAM, ROM, an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device such as a punch card or a raised structure in a groove having instructions stored thereon, and any suitable combination thereof. The computer-readable storage medium used here is not construed as transient signals per se, such as radio waves or other freely propagating electromagnetic waves, electromagnetic waves propagating through waveguides or other transfer media (for example, optical pulses through fiber-optic cables), or electrical signals transmitted through electrical wires.

The computer-readable program instructions described herein may be downloaded from a computer-readable storage medium to various computing/processing devices, or downloaded to an external computer or external storage device via a network such as the Internet, a local area network, a wide area network, and/or a wireless network. The network may include copper transmission cables, optical fiber transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages. The programming languages include object-oriented programming languages such as Smalltalk and C++ and conventional procedural programming languages such as "C" language or similar programming languages. The computer-readable program instructions may be executed entirely on a user computer, partly on a user computer, as a standalone software package, partly on a user computer and partly on a remote computer, or entirely on a remote computer or a server. In the case where a remote computer is involved, the remote computer may be connected to a user computer over any kind of networks, including a local area network (LAN) or a wide area network (WAN), or may be connected to an external computer (e.g., connected over the Internet using an Internet service provider). In some embodiments, an electronic circuit, such as a programmable logic circuit, a field-programmable gate array (FPGA), or a programmable logic array (PLA), is customized by utilizing state information of the computer-readable program instructions. The electronic circuit may execute the computer-readable program instructions so as to implement various aspects of the present disclosure.

Various aspects of the present disclosure are described here with reference to flowcharts and/or block diagrams of the methods, the apparatuses (systems), and the computer program products according to embodiments of the present disclosure. It should be understood that each block in the flowcharts and/or block diagrams as well as a combination of blocks in the flowcharts and/or block diagrams may be implemented by using computer-readable program instructions.

The computer-readable program instructions may be provided to a processing apparatus of a general purpose computer, a special purpose computer, or another programmable data processing apparatus to produce a machine, such that the instructions, when executed by the processing apparatus of the computer or another programmable data processing apparatus, generate an apparatus for implementing the functions/actions specified in one or more blocks in the flowcharts and/or block diagrams. The computer-readable program instructions may also be stored in a computer-readable storage medium. These instructions cause a computer, a programmable data processing apparatus, and/or another device to operate in a particular manner, such that the computer-readable medium storing the instructions includes an article of manufacture that includes instructions for implementing various aspects of the functions/actions specified in one or more blocks in the flowcharts and/or block diagrams.

The computer-readable program instructions may also be loaded onto a computer, other programmable data processing apparatuses, or other devices, so that a series of operating steps are performed on the computer, other programmable data processing apparatuses, or other devices to produce a computer-implemented process, so that the instructions executed on the computer, other programmable data processing apparatuses, or other devices implement the functions/actions specified in one or more blocks in the flowcharts and/or block diagrams.

The flowcharts and block diagrams in the accompanying drawings show the architectures, functionalities, and operations of possible implementations of the system, the method, and the computer program product according to multiple embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, the functions marked in the blocks may also occur in an order different from that marked in the accompanying drawings. For example, two successive blocks may actually be executed in parallel substantially, or they may be executed in an opposite order sometimes, depending on the functions involved. It should be further noted that each block in the block diagrams and/or flowcharts as well as a combination of blocks in the block diagrams and/or flowcharts may be implemented by using a special hardware-based system for executing specified functions or actions or by a combination of special hardware and computer instructions.

Illustrative embodiments of the present disclosure have been described above. The above description is illustrative, rather than exhaustive, and is not limited to the disclosed embodiments. Numerous modifications and alterations are apparent to those of ordinary skill in the art without departing from the scope and spirit of the illustrated various embodiments. The selection of terms as used herein is intended to best explain the principles and practical applications of the various embodiments or technical improvements to technologies on the market, and to otherwise enable persons of ordinary skill in the art to understand the various embodiments disclosed herein.

What is claimed is:

1. A method for acquiring visual content, comprising:
   if a request for viewing visual content is received from a terminal device, determining, at a content providing device, target visual content corresponding to the request;
   based on storage information related to at least one copy of the target visual content, determining a to-be-provided copy from the at least one copy; and
   transmitting the to-be-provided copy to the terminal device;
   wherein determining the to-be-provided copy comprises:
   based on the storage information related to the at least one copy of the target visual content, determining a plurality of distances between respective storage locations of the at least one copy and a location of the terminal device;
   determining a first distance smaller than a threshold distance from the plurality of distances, the threshold distance being based at least in part on a delay requirement of rendering the target visual content; and
   determining a copy corresponding to the first distance among the at least one copy as the to-be-provided copy.

2. The method according to claim 1, wherein determining the target visual content comprises:
   acquiring state information of the terminal device, the state information including an image of an environment surrounding the terminal device; and
   based on the state information, determining the target visual content.

3. The method according to claim 2, wherein acquiring the state information comprises acquiring the state information from at least one of the following:
   a sensor provided on the terminal device;
   a sensor provided in the environment surrounding the terminal device; and
   a sensor worn by a user of the terminal device.

4. The method according to claim 2, wherein determining the target visual content based on the state information comprises:
   recognizing a target object from the image of the environment; and
   determining visual content associated with the target object as the target visual content.

5. The method according to claim 1, wherein the terminal device comprises at least one of an augmented reality content viewing device and a mixed reality content viewing device.

6. A computer program product tangibly stored in a non-transitory computer storage medium and comprising machine-executable instructions, wherein when executed by a device, the machine-executable instructions cause the device to implement the method according to claim 1.

7. The method according to claim 1, further comprising:
   responsive to a plurality of storage locations having the first distance smaller than the threshold distance, randomly determining one storage location from the plurality of storage locations; and
   utilizing a copy stored in the randomly determined storage location as the to-be-provided copy.

8. A method for acquiring visual content, comprising:
   if a request for viewing visual content is received, determining, at a terminal device, a content providing device for providing a copy of target visual content corresponding to the request;
   sending the request to the content providing device; and
   receiving the target visual content from the content providing device, the target visual content being determined by the content providing device;
   wherein determining the content providing device comprises:
   determining a plurality of distances between respective candidate devices and the terminal device:
   determining a first distance smaller than a threshold distance from the plurality of distances, the threshold distance being based at least in part on a delay requirement of rendering the target visual content; and
   determining a candidate device corresponding to the first distance among the respective candidate devices as the content providing device.

9. The method according to claim 8, further comprising:
   acquiring an image of an environment surrounding the terminal device; and
   sending state information of the terminal device to the content providing device, the state information including the image.

10. The method according to claim 8, wherein the terminal device includes at least one of an augmented reality content viewing device and a mixed reality content viewing device.

11. A computer program product tangibly stored in a non-transitory computer storage medium and comprising machine-executable instructions, wherein when executed by a device, the machine-executable instructions cause the device to implement the method according to claim 8.

12. The method according to claim 8, further comprising:
    responsive to a plurality of candidate devices having the first distance smaller than the threshold distance, randomly determining one candidate device from the plurality of candidate devices as the content providing device.

13. At least one electronic device, comprising:
    at least one processing unit; and
    at least one memory coupled to the at least one processing unit and storing instructions for execution by the at least one processing unit, wherein the instructions, when executed by the at least one processing unit, cause the device to perform actions comprising:

if a request for viewing visual content is received from a terminal device, determining, at a content providing device, target visual content corresponding to the request;

based on storage information related to at least one copy of the target visual content, determining a to-be-provided copy from the at least one copy; and transmitting the to-be-provided copy to the terminal device;

wherein determining the to-be-provided copy comprises:

based on the storage information related to the at least one copy of the target visual content, determining a plurality of distances between respective storage locations of the at least one copy and a location of the terminal device;

determining a first distance smaller than a threshold distance from the plurality of distances, the threshold distance being based at least in part on a delay requirement of rendering the target visual content; and determining a copy corresponding to the first distance among the at least one copy as the to-be-provided copy.

14. The device according to claim 13, wherein determining the target visual content comprises:

acquiring state information of the terminal device, the state information including an image of an environment surrounding the terminal device; and based on the state information, determining the target visual content.

15. The device according to claim 14, wherein acquiring the state information comprises acquiring the state information from at least one of the following:

a sensor provided on the terminal device;

a sensor provided in the environment surrounding the terminal device; and a sensor worn by a user of the terminal device.

16. The device according to claim 14, wherein determining the target visual content based on the state information comprises:

recognizing a target object from the image of the environment; and determining visual content associated with the target object as the target visual content.

17. The device according to claim 13, wherein the terminal device comprises at least one of an augmented reality content viewing device and a mixed reality content viewing device.

18. The device according to claim 13, wherein the instructions, when executed by the at least one processing unit, cause the device to perform actions comprising:

determining, at the terminal device, a content providing device for providing a copy of target visual content corresponding to the request;

sending the request to the content providing device; and receiving the target visual content from the content providing device, the target visual content being determined by the content providing device.

19. The device according to claim 18, wherein determining the content providing device comprises:

determining at least one distance between at least one candidate device and the terminal device;

determining a first distance smaller than a threshold distance from the at least one distance; and determining a candidate device corresponding to the first distance among the at least one candidate device as the content providing device.

20. The device according to claim 13, wherein:

responsive to a plurality of storage locations having the first distance smaller than the threshold distance, randomly determining one storage location from the plurality of storage locations; and utilizing a copy stored in the randomly determined storage location as the to-be-provided copy.

* * * * *

UNITED STATES PATENT AND TRADEMARK OFFICE
CERTIFICATE OF CORRECTION

PATENT NO. : 11,102,327 B1
APPLICATION NO. : 17/080307
DATED : August 24, 2021
INVENTOR(S) : Danqing Sha et al.

Page 1 of 1

It is certified that error appears in the above-identified patent and that said Letters Patent is hereby corrected as shown below:

In the Claims

Claim 8, Column 14, Line 32, please delete "terminal device:" and insert therefor --terminal device;--

Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*